US009494100B2

(12) United States Patent
Rösel

(10) Patent No.: US 9,494,100 B2
(45) Date of Patent: Nov. 15, 2016

(54) DETERMINING THE CLOSING POINT IN TIME OF AN INJECTION VALVE ON THE BASIS OF AN ANALYSIS OF THE ACTUATION VOLTAGE USING AN ADAPTED REFERENCE VOLTAGE SIGNAL

(75) Inventor: Gerd Rösel, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 1021 days.

(21) Appl. No.: 13/700,798

(22) PCT Filed: May 5, 2011

(86) PCT No.: PCT/EP2011/057239
§ 371 (c)(1),
(2), (4) Date: Nov. 29, 2012

(87) PCT Pub. No.: WO2011/151128
PCT Pub. Date: Dec. 8, 2011

(65) Prior Publication Data

US 2013/0073188 A1 Mar. 21, 2013

(30) Foreign Application Priority Data

May 31, 2010 (DE) ........................ 10 2010 022 109

(51) Int. Cl.
*G06F 7/00* (2006.01)
*G06F 17/00* (2006.01)
(Continued)

(52) U.S. Cl.
CPC ........... *F02D 41/3005* (2013.01); *F02D 41/20* (2013.01); *H01F 7/1844* (2013.01); *F02D 2041/2051* (2013.01); *F02D 2041/2055* (2013.01)

(58) Field of Classification Search
CPC .................. F02D 41/3005; F02D 41/20; F02D 2041/2055; H01F 7/1844
(Continued)

(56) References Cited

U.S. PATENT DOCUMENTS 4,941,348 A * 7/1990 Hock ...................... G01P 13/00 324/654
4,990,854 A * 2/1991 Friz ........................... B60T 8/36 324/418
(Continued)

FOREIGN PATENT DOCUMENTS

DE 3843138 A1 6/1990 ................ B60T 8/36
DE 4011217 A1 10/1991 ................ B60T 8/36
(Continued)

OTHER PUBLICATIONS

German Office Action, Application No. 10 2010 022 109.0-26, 3 pages, Nov. 23, 2010.
(Continued)

*Primary Examiner* — Mahmoud Gimie
*Assistant Examiner* — David Hamaoui
(74) *Attorney, Agent, or Firm* — Slayden Grubert Beard PLLC

(57) ABSTRACT

A method for determining a closing time of a valve having a coil drive may include switching off a current flow through a coil of the coil drive so that the coil is depowered, measuring a time curve of a voltage induced in the non-powered coil, wherein the induced voltage is generated at least partially by a motion of the armature relative to the coil, evaluating the measured time curve of the voltage induced in the coil, wherein the evaluation comprises comparing the measured time curve of the voltage induced in the depowered coil to a reference voltage curve stored in an engine controller, and determining the closing time based on the
(Continued)

evaluated time curve. The reference voltage curve is thereby adapted to current operating conditions of the valve. A corresponding device and computer program for determining the closing time of a valve comprising a coil drive are also disclosed.

10 Claims, 7 Drawing Sheets

(51) Int. Cl.
*F02D 41/30* (2006.01)
*F02D 41/20* (2006.01)
*H01F 7/18* (2006.01)

(58) Field of Classification Search
USPC ........ 701/105; 702/57, 64, 150; 251/129.15; 336/130; 324/207.16, 207.24
See application file for complete search history.

(56) References Cited

U.S. PATENT DOCUMENTS

| | | | | |
|---|---|---|---|---|
| 5,245,501 | A | 9/1993 | Locher et al. | 361/154 |
| 5,650,909 | A * | 7/1997 | Remele | F02D 41/20 361/154 |
| 5,687,694 | A * | 11/1997 | Kanno | F02B 61/045 123/478 |
| 5,880,920 | A | 3/1999 | Fischer et al. | 361/187 |
| 6,359,435 | B1 * | 3/2002 | Czimmek | F01L 9/04 123/90.11 |
| 6,949,923 | B2 * | 9/2005 | Schultz | H01F 7/1844 324/207.18 |
| 7,377,265 | B2 * | 5/2008 | Kojima | F02D 41/20 123/478 |
| 7,413,160 | B2 * | 8/2008 | Beilharz | F02D 41/2096 123/447 |
| 7,454,299 | B2 * | 11/2008 | Bolz | F02D 41/20 251/129.09 |
| 7,469,679 | B2 * | 12/2008 | Puckett | F02D 41/20 123/446 |
| 8,887,560 | B2 * | 11/2014 | Beer | F02D 41/20 73/114.49 |
| 8,914,249 | B2 * | 12/2014 | Imaizumi | G01R 27/02 324/713 |
| 8,935,114 | B2 * | 1/2015 | Beer | F02D 41/20 123/90.11 |
| 9,103,297 | B2 * | 8/2015 | Brandt | F02D 41/2096 |
| 2012/0116702 | A1 | 5/2012 | Beer et al. | 702/65 |
| 2013/0073188 | A1 | 3/2013 | Rösel | 701/105 |

FOREIGN PATENT DOCUMENTS

| | | | | |
|---|---|---|---|---|
| DE | 19611885 | A1 | 10/1997 | F02D 41/20 |
| DE | 19834405 | A1 | 2/2000 | F02D 41/20 |
| DE | 10150199 | A1 | 4/2003 | H01F 7/18 |
| DE | 102004020937 | A1 | 11/2005 | F02D 41/20 |
| DE | 102006035225 | A1 | 2/2007 | H01F 7/122 |
| DE | 10356858 | B4 | 4/2007 | F02D 41/20 |
| DE | 102005044886 | A1 | 4/2007 | F02D 41/20 |
| DE | 102008041528 | A1 | 3/2010 | F02D 41/22 |
| DE | 102009044969 | A1 | 3/2011 | F02D 41/20 |
| WO | 2011/003704 | A1 | 1/2011 | F02D 41/20 |
| WO | 2011/151128 | A1 | 12/2011 | F02D 41/20 |

OTHER PUBLICATIONS

International Search Report and Written Opinion, Application No. PCT/EP2011/057239, 20 pages, Aug. 25, 2011.

* cited by examiner

DETERMINING THE CLOSING POINT IN TIME OF AN INJECTION VALVE ON THE BASIS OF AN ANALYSIS OF THE ACTUATION VOLTAGE USING AN ADAPTED REFERENCE VOLTAGE SIGNAL

CROSS-REFERENCE TO RELATED APPLICATIONS

This application is a U.S. National Stage application of International Application No. PCT/EP2011/057239 filed May 5, 2011, which designates the United States of America, and claims priority to DE Application No. 10 2010 022 109.0 filed May 31, 2010, the contents of which are hereby incorporated by reference in their entirety.

TECHNICAL FIELD

The present disclosure relates to the technical field of the actuation of coil drives for an injection valve, e.g., for a direct injection valve for an internal combustion engine of a motor vehicle. More particularly, the present disclosure relates to a method for determining the closing time of an injection valve having a coil drive. The present disclosure also relates to a corresponding device and to a computer program for determining the closing time of a valve having a coil drive.

BACKGROUND

For the operation of modern internal combustion engines and compliance with strict emission limiting values, an engine controller determines the air mass which is enclosed in a cylinder per working cycle. As a function of the air mass and the desired “lambda” ratio between the air quantity and fuel quantity, a specific quantity of fuel is injected via an injection valve which is also referred to as an injector in this document. For this purpose, a corresponding fuel quantity setpoint value (MFF_SP) is calculated by the engine controller. The fuel quantity which is to be injected can therefore be dimensioned in such a way that a value for lambda which is optimum for the exhaust gas post-treatment in the catalytic converter is available.

The main requirement made of the injection valve is not only leakproofness to prevent undesired discharge of fuel and preparation of a fuel jet but also chronologically precise dimensioning of the injection quantity. For example in the case of supercharged spark ignition engines which operate with direct injection of fuel, a very high degree of quantity spreading of the required fuel quantity is necessary. For example, for supercharged operation a maximum fuel quantity MFF_max has to be metered per working cycle, while during operation which is close to idling a minimum fuel quantity MFF_min has to be metered. The two characteristic variables MFF_max and MFF_min define here the limits of the linear working range of the injection valve. This means that for these injection quantities there is a linear relationship between the injection time (electrical actuation period (Ti)) and the injected fuel quantity per working cycle (MFF).

For direct injection valves with a coil drive, the quantity spread, i.e. the quotient between MFF_max and MFF_min, can be between 6 and 40 depending on the respective engine power. In specific cases, the quantity spread can be even larger. For future engines with reduced CO2 emissions, the cubic capacity will be reduced and the engine rated power is at least maintained by means of engine supercharging mechanisms. The requirement made of the maximum fuel quantity MFF_max therefore corresponds at least to the requirements of an induction engine with a relatively large cubic capacity. However, the minimum fuel quantity MFF_min is determined by means of operation near to idling and the minimum air mass in overrun conditions of the engine with a reduced cubic capacity, and said minimum fuel quantity MFF_min is therefore decreased. This results in an increased requirement in terms both of the quantity spread and of the minimum fuel quantity MFF_min for future engines.

In known injection systems, a significant deviation of the actual injection quantity from the nominal injection quantity occurs in the case of injection quantities which are smaller than MFF_min. This deviation is due essentially to fabrication tolerances at the injection as well as to tolerances of the output stage, which actuates the injector, in the engine controller and therefore to deviations from the nominal actuation current profile.

The characteristic curve of an injection valve defines the relationship between the injected fuel quantity MFF and the time period Ti of the electrical actuation (MFF=f(Ti)). The inversion of this relationship Ti=g(MFF_SP) is used in the engine controller to convert the setpoint fuel quantity (MFF_SP) into the necessary injection time. The influencing variables, such as the fuel pressure, cylinder internal pressure during the injection process and possible variations of the supply voltage, which are additionally included in this calculation are omitted here for the sake of simplification.

FIG. 7*a* shows the characteristic curve of a direct injection valve. In this context, the injected fuel quantity MFF is plotted as a function of the time period Ti of the electrical actuation. In a good approximation, a linear working range is obtained for the time periods Ti longer than Ti_min, and the injected fuel quantity MFF is directly proportional to the time period Ti of the electrical actuation. Linear behavior does not occur for time periods Ti shorter than Ti_min. In the illustrated example, Ti_min is approximately 0.5 ms.

The gradient of the characteristic curve in the linear working range corresponds to the static flow through the injection valve during the complete valve stroke. The cause of the non-linear behavior for time periods Ti shorter than approximately 0.5 ms or for fuel quantities MFF<MFF_min is, in particular, the inertia of an injection spring mass system and the chronological behavior during the build up and reduction of the magnetic field through a coil, which magnetic field activates the valve needle of the injection valve. As a result of these dynamic effects, the entire valve stroke is no longer reached in what is referred to as the ballistic region. This means that the valve is closed again before the end position which defines the maximum valve stroke has been reached.

In order to provide a reproducible injection quantity, injection valves are usually operated in the linear working range. A stable operation in the non-linear range is currently not possible since a significant systematic error occurs in the injection quantity owing (a) to the above-mentioned tolerances in the supply voltage and therefore also in the current profile and (b) to mechanical tolerances of injection valves (for example by tensile force of the closing spring, internal friction in the armature/needle system). For reliable operation of an injection valve, this results in a minimum fuel quantity MFF_min per injection pulse, which minimum fuel quantity MFF_min at least has to be provided in order to be able to implement the desired injection quantity precisely in terms of the quantity. In the example illustrated in FIG. 7*a*, this minimum fuel quantity MFF_min is somewhat smaller than 5 mg.

The electrical actuation of an injection valve usually takes place by means of current-controlled full bridge output stages of the engine controller. A full bridge output stage makes it possible to apply an on-board power system voltage of the motor vehicle, and alternatively a boosting voltage, to the injection valve. The boosting voltage is frequently also referred to as a boost voltage (U_boost) and can be, for example, approximately 60 v.

FIG. 7*b* shows a typical current actuation profile I (thick unbroken line) for a direct injection valve with a coil drive. FIG. 7*b* also shows the corresponding voltage U (thin continuous line) which is applied to the direct injection valve. The actuation is divided into the following phases:

A) Pre-charge phase: during this phase with the duration t_pch, the battery voltage U_bat, which corresponds to the voltage of the on-board power system of the motor vehicle, is applied to the coil drive of the injection valve. When current setpoint value I_pch is reached, the battery voltage U_bat is switched off by a two-point regulator, and after a further current threshold has been undershot, U_bat is switched on again.

B) Boost phase: here, the output stage applies the boosting voltage U_boost to the coil drive until a predefined maximum current I_peak is reached. The rapid build-up of current speeds up the opening of the injection valve. After I_peak has been reached, there follows a free-wheeling phase up to the expiry of t_1, during which free-wheeling phase the battery voltage U_bat is then applied to the coil drive. The time period Ti of the electrical actuation is measured from the start of the boost phase. The transition to the free-wheeling phase is triggered by I_peak being exceeded.

C) Commutation phase: the commutation phase begins with the switching off of the voltage, as a result of which a self-induction voltage is generated. Said voltage is limited essentially to the boosting voltage U_boost. The limitation of the voltage during this self-induction is composed of the sum of U_boost as well as the forward voltages of a recuperation diode and of what is referred to as a free-wheeling diode. The sum of these voltages is referred to below as the recuperation voltage. On account of the differential voltage measurement, on which FIG. 5 is based, the recuperation voltage is illustrated in a negative form in the commutation phase.

The recuperation voltage results in a flow of current through the coil, which flow reduces the magnetic field to a minimum. The commutation phase, which depends on the battery voltage U_bat and on the duration t_1 of the boost phase, ends after the expiry of a further time period t_2.

D) Holding phase: here, the setpoint value for the holding current setpoint value I_hold is adjusted using the battery voltage U_bat by means of a two-point regulator.

E) Switch-off phase: switching off the voltage results, in turn, in a self-induction voltage which is also limited to the recuperation voltage. This results in a flow of current through the coil, which flow then reduces the magnetic field. After the recuperation voltage, which is illustrated in a negative form here, has been exceeded, no current flows any more. This state is also referred to as "open coil". Owing to the ohmic resistances of the magnetic material, the eddicurrents which are induced during the field reduction of the coil decay. The reduction in the eddicurrents leads in turn to a change in the field of the solenoid and therefore to a voltage induction. This induction effect leads to the voltage value at the injector rising to zero starting from the level of the recuperation voltage in accordance with the profile of an exponential function. After the reduction of the magnetic force the injector closes by means of the spring force and the hydraulic force caused by the fuel pressure.

The described actuation of the injection valve has the disadvantage that the precise time of closing of the injection valve or of the injector in the "open coil" phase cannot be determined. Since a variation of the injection quantity correlates with the resulting variation of the closing time, the absence of this information, for example at very small injection quantities which are less than MFF_min, results in a considerable degree of uncertainty regarding the fuel quantity which is actually injected into the combustion chamber of a motor vehicle engine.

DE 38 43 138 A1 discloses a method for controlling and sensing the movement of an armature of an electromagnetic switching element. During the switching off of the switching element, a magnetic field is induced in its exciter winding, which magnetic field is changed by the armature movement. The changes in timing of the voltage applied to the exciter winding which are due to this can be used to sense the end of the armature movement. DE 10 2006 035 225 A1 discloses an electromagnetic actuating device which has a coil. By evaluating induced voltage signals, which are caused by external mechanical influences, the actual movement of the actuating device can be analyzed.

DE 198 34 405 A1 discloses a method for estimating a needle stroke of a solenoid valve. During the movement of the valve needle relative to a coil of the solenoid valve, the voltages which are induced in the coil are sensed and placed in relationship with the stroke of a valve needle by means of a computing model. In order to determine the contact time, the time derivative dU/dt of the coil voltage can be used since this signal has large jumps at the reversal point of the needle movement or armature movement.

DE 103 56 858 B4 discloses an operating method for an actuator of an injection valve. A measured time profile of an electrical operating variable of the actuator is compared with a stored reference curve which represents the chronological profile of this operating variable in a reference pattern.

SUMMARY

In one embodiment, a method for determining a closing time of a valve having a coil drive, e.g., of a direct injection valve for an internal combustion engine of a motor vehicle, comprises: switching off a current flow through a coil of the coil drive, with the result that the coil is de-energized, sensing of a time profile of a voltage which is induced in the de-energized coil, wherein the induced voltage is generated at least partially by a movement of the magnet armature relative to the coil, evaluating the sensed time profile of the voltage which is induced in the coil, wherein the evaluation comprises comparing the sensed time profile of the voltage which is induced in the de-energized coil with a reference voltage profile which is stored in an engine controller, and determining the closing time on the basis of the evaluated time profile, wherein the reference voltage profile is adapted to the current operating conditions of the valve.

In a further embodiment, the method also comprises determining a test reference voltage profile by applying a test voltage pulse to the coil of the coil drive, wherein the time period of the test voltage pulse is dimensioned in such a way that the movement of the magnet armature relative to the coil is smaller than a predefined threshold value, comparing the test reference voltage profile with the reference voltage profile stored in the engine controller, and adapting the stored reference voltage profile on the basis of a result of the comparison of the test reference voltage profile with the reference voltage profile stored in the engine controller.

In a further embodiment, the test reference voltage profile is determined in that, after the end of the applied test voltage pulse, the time profile of the voltage which is induced in the de-energized coil is sensed. In a further embodiment, the test voltage pulse is applied to the coil of the coil drive at a time which has a predefined offset from an ignition time in a cylinder which is assigned to the valve. In a further embodiment, the comparison of the test reference voltage profile with the reference voltage profile which is stored in the engine controller comprises the formation of a difference between the test reference voltage profile and the reference voltage profile which is stored in the engine controller. In a further embodiment, the comparison of the test reference voltage profile with the reference voltage profile which is stored in the engine controller comprises the formation of a quotient between the test reference voltage profile and the reference voltage profile which is stored in the engine controller. In a further embodiment, the method also comprises comparing the adapted stored reference voltage profile with a predefined setpoint reference voltage profile, determining at least one adaptation value with which the predefined setpoint reference voltage profile can be changed at least approximately into the adapted stored reference voltage profile, and monitoring the at least one adaptation value for exceeding and/or undershooting of a predefined threshold.

In a further embodiment, the evaluation of the sensed time profile of the voltage which is induced in the coil is carried out within a time interval which contains the expected closing time. In a further embodiment, the evaluation of the sensed time profile of the voltage which is induced in the coil comprises comparing a time derivative of the sensed time profile of the voltage which is induced in the coil with a time derivative of the reference voltage profile which is stored in the engine controller.

In another embodiment, a device for determining a closing time of a valve having a coil drive, e.g., of a direct injection valve for an engine of a motor vehicle, may comprise: a switch-off unit for switching off a current flow through a coil of the coil drive, with the result that the coil is de-energized, a sensing unit for sensing a time profile of a voltage which is induced in the de-energized coil, wherein the induced voltage is generated at least partially by a movement of the magnet armature relative to the coil, and an evaluation unit, configured to evaluate the sensed time profile of the voltage which is induced in the coil, wherein the evaluation comprises comparing the sensed time profile of the voltage which is induced in the de-energized coil with a reference voltage profile which is stored in an engine controller and which is adapted to current operating conditions of the valve, and to determine the closing time on the basis of the evaluated time profile.

In another embodiment, a computer program is provided for determining a closing time of a valve having a coil drive, e.g., a direct injection valve for an engine of a motor vehicle, wherein the computer program, when executed by a processor, is configured to perform any of the methods disclosed above.

BRIEF DESCRIPTION OF THE DRAWINGS

Example embodiments will be explained in more detail below with reference to figures, in which.

DETAILED DESCRIPTION

Figure 1:
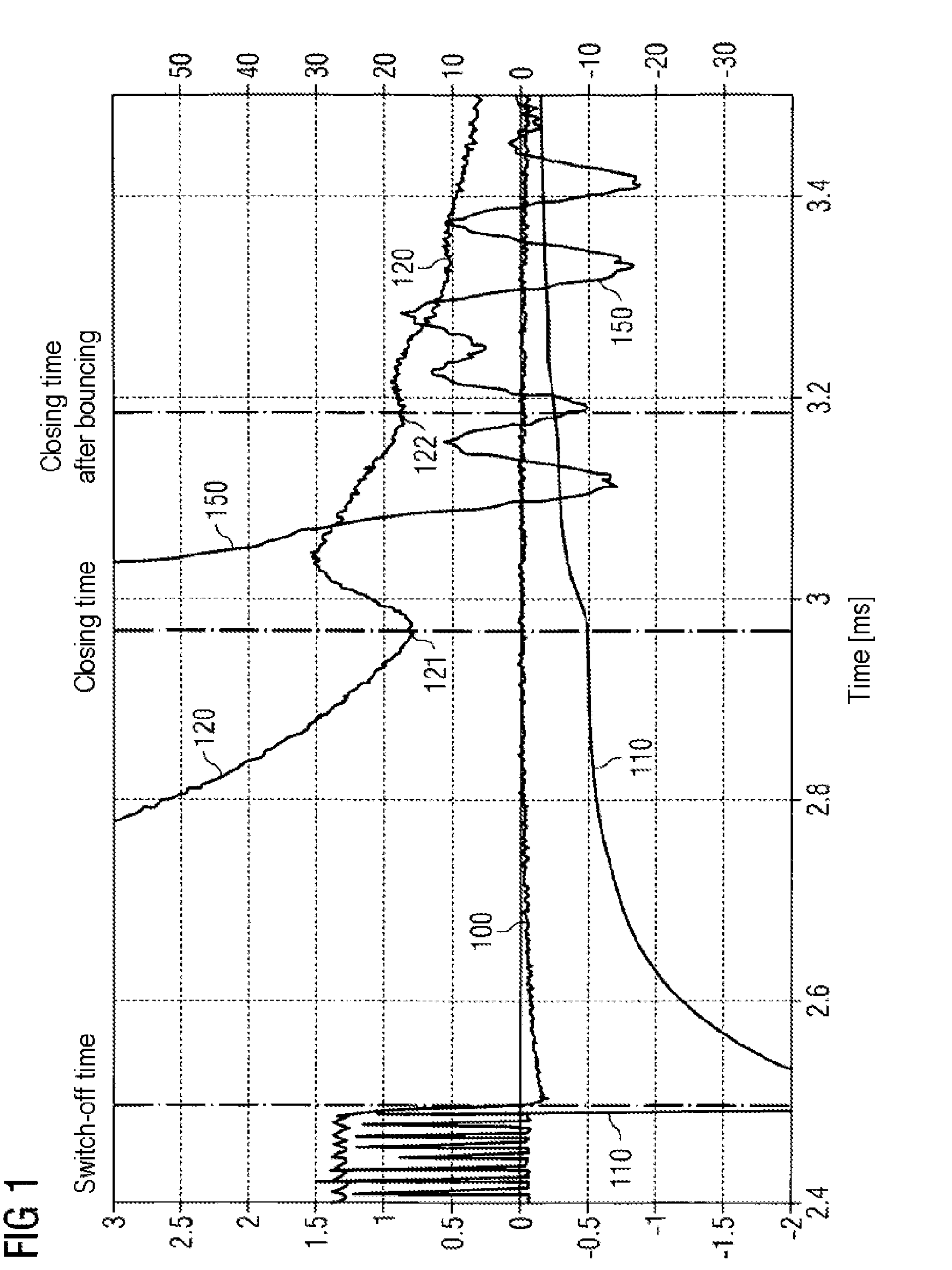
FIG. 1 shows various signal profiles which occur at the end of the holding phase and in the switch-off phase of a direct injection valve.

Embodiments of the present disclosure provide an easy-to-implement method as well as a corresponding device for precisely determining the closing time within the switch-off phase of an injection valve.

According to a first embodiment, a method for determining a closing time of a valve having a coil drive is described, wherein the valve is, for example, a direct injection valve for an internal combustion engine of a motor vehicle. The described method comprises (a) switching off a current flow through a coil of the coil drive, with the result that the coil is de-energized, (b) sensing of a time profile of a voltage which is induced in the de-energized coil, wherein the induced voltage is generated at least partially by a movement of the magnet armature relative to the coil, (c) evaluating the sensed time profile of the voltage which is induced in the coil, wherein the evaluation comprises comparing the sensed time profile of the voltage which is induced in the de-energized coil with a reference voltage profile which is stored in an engine controller, and (d) determining the closing time on the basis of the evaluated time profile. The reference voltage profile may be adapted to the current operating conditions of the valve.

The described closing time detection method is based on the realization that a voltage signal which is caused by the movement of the magnet armature through induction can be used in the coil to characterize the movement sequence of the magnet armature and determine the closing time therefrom. In this context, the voltage signal which is caused by the movement by induction owing to the remanent magnetic field of the magnet armature is then typically at its maximum when the method armature is located directly before its stop or before its closed position. This is due to the fact that in the de-energized state of the coil the relative speed between the magnet armature and the coil is at a maximum directly before the stopping of the moved magnet armature.

The voltage profile of the voltage which is induced in the de-energized coil is therefore determined at least partially by the movement of the magnet armature. Through suitable evaluation of the time profile of the voltage which is induced in the coil it is possible, at least in a good approximation, to determine the portion which is due to the relative movement between the magnet armature and coil. In this way, information about the movement profile which permits conclusions to be drawn about the time of the maximum speed and therefore also about the time of the closing of the valve is also acquired automatically.

Through the comparison of the sensed time profile of the voltage which is induced in the de-energized coil with a reference voltage profile it is possible to acquire particularly accurate information about the actual movement of the magnet armature.

The reference voltage profile may be selected, for example in such a way that it describes the portion of the induced voltage which is caused by decaying eddicurrents in the magnetic circuit. It is therefore possible, for example through simple formation of differences between the voltage which is induced in the coil and the reference voltage profile, to determine the actual movement of the magnet armature.

Expressed clearly, the quantity accuracy of the injection can be improved by modulating the valve closing time. The measurement variable for this control is a characteristic bend, derived from the voltage profile of the injector voltage during the closing of the valve, in the curved profile of the induced voltage, which bend is caused substantially by induction and a change in inductivity. In order to be able to use the voltage signal profile to calculate the characteristic which is significant for the closing of the valve, a comparison of a reference signal or reference voltage profile is carried out. The useful signal for determining the actual closing time can be acquired from the difference between the reference voltage profile and the profile of the induced voltage.

According to some embodiments, the reference voltage profile is adapted to the currently present operating conditions of the valve. In this case, the operating conditions can basically be determined by all the possible physical variables which can influence the actual movement of the valve.

The operating conditions are determined, for example, by the ambient temperature and/or the operating temperature of the valve. In addition, the current state of the valve, which can change, for example, due to ageing, can have an influence on the actual movement of the valve. Furthermore, what is referred to as manufacturing tolerance, can cause the closing behavior of a specific valve to differ at least somewhat from nominal behavior of a reference valve.

In addition, it is possible, for example as a result of temperature fluctuation, ageing and/or manufacturing tolerance, that these operating conditions not only influence the mechanical system of the valve but also electrical properties of the coil drive such as, for example, the inductivity and/or resistance thereof.

The adaptation of the reference voltage profile to the current operating conditions can permit a particularly high level of accuracy of the determination of the actual closing time to be achieved. The described adaptation can be carried out here individually for each valve online in a vehicle during operation thereof.

It is to be noted that the physical variables mentioned here which have an influence on the operating conditions of the valve are merely exemplary and cannot constitute a conclusive enumeration.

According to one embodiment, the method also comprises (a) determining a test reference voltage profile by applying a test voltage pulse to the coil of the coil drive, wherein the time period of the test voltage pulse is dimensioned in such a way that the movement of the magnet armature relative to the coil is smaller than a predefined threshold value, (b) comparing the test reference voltage profile with the reference voltage profile stored in the engine controller, and (c) adapting the stored reference voltage profile on the basis of a result of the comparison of the test reference voltage profile with the reference voltage profile stored in the engine controller.

During operation of an injection system having the valve, the described test voltage is, for example, an additional voltage pulse which does not bring about any opening, or only brings about negligible opening, of the valve. In this context, “additional voltage pulse” means that the respective voltage pulse is applied to the coil in addition to the customary voltage pulses, wherein the customary voltage pulses bring about those injection processes which are necessary for customary operation of the internal combustion engine. Applying additional (test) voltage pulses to the coil allows the reference voltage profile during the operation of the internal combustion engine to be determined actively and online or to be easily adapted to the respective operating conditions.

The test voltage pulse may have the same magnitude as a customary voltage pulse. This may make it possible to ensure that the determined reference voltage profile for the described comparison with the sensed time profile of the voltage which is induced in the de-energized coil has at least a similar magnitude. As a result, the movement-induced portion and therefore also the movement of the magnet armature can then be determined with particularly good accuracy.

The threshold value can be selected in such a way that during operation no fuel injection, or at least no appreciable fuel injection, occurs. This means that the actuation of the coil for the purpose of determining the reference voltage profile is so short that compared to the desired injection or the desired injection quantities due to customary injection pulses no quantities, or only very small quantities, of fuel are additionally injected.

Of course, the mass of the magnet armature and the mechanical inertia which is set for the magnet armature which is associated with the mass of the magnet armature play a decisive role in the selection of the duration of the test voltage pulse. The greater this mass, the longer the time period of the test voltage pulse may be in order, nevertheless, to limit the undesired valve opening to a minimum, with the result that additional emissions of pollutants can be avoided or reduced to a minimum.

It is to be noted that the smaller the movement of the magnet armature which is caused by the additional test voltage pulse, the greater the degree to which the determined reference voltage profile represents only the voltage portion of the entire coil signal which is induced by decaying eddicurrents. This means that when an armature movement is completely avoided, the reference voltage profile represents exclusively the portion of the induced voltage which is induced by decaying eddicurrents after the switching off of the coil current. This has the advantage that later when an induced voltage signal is compared with the reference voltage profile which is determined in this way the portion which is brought about by decaying eddicurrents can be easily and precisely eliminated. As a result, the portion of the coil voltage which is induced by the magnet armature movement can then be determined particularly precisely.

The threshold value can be described here by means of various physical parameters. For example, the threshold value can describe a maximum displacement distance which the magnet armature can travel in the direction of the opening position of the valve as a result of the applied test voltage pulse. The threshold value can also define a maximum time within which the valve is (partially) opened. This time should, however, also be so short that the emissions of pollutants which are associated with the additional (partial) opening are kept within acceptable limits.

However, since it is not possible to rule out the possibility of fuel being undesirably injected through an additional (partial) valve opening due to the test voltage pulse, the test voltage pulse should not be applied in every working cycle of the internal combustion engine. Since the operating conditions of the valve also usually do not change so quickly, it is sufficient to apply the test voltage pulse only from time to time, for example once every 100, 1000 or 10,000 working cycles. The number of working cycles which can be executed by the internal combustion engine between two successive test voltage pulses can also depend on the operating state of the engine. It is therefore possible, for example, to trigger the application of a test voltage pulse from the outside, for example by an engine controller, in a starting phase if it is expected that the operating conditions have changed in the meantime.

It is to be noted that the application of the test voltage pulse also, of course, requires (electrical) energy. For this reason, test voltage pulses should also not be applied to the coil too frequently, so as to avoid unnecessarily increasing the overall energy consumption of a motor vehicle.

The test reference voltage profile can extend over a time window which is also filled by the reference voltage profile which is, for example, stored in an engine controller. However, it is also possible for the test reference voltage profile to be merely sensed and/or stored in a shorter time window than the time window of the stored reference voltage profile. It is also possible for the test reference voltage profile to contain merely one direct measured value which is then compared with a chronologically corresponding function value of the stored reference voltage profile.

According to a further embodiment, the test reference voltage profile is determined in that, after the end of the applied test voltage pulse, the time profile of the voltage which is induced in the de-energized coil is sensed. The voltage profile which is sensed in this way, i.e. without a movement, or only with a negligible movement, of the magnet armature therefore reflects, at least in a good approximation, the portion of the induced voltage signal which is due to decaying eddicurrents. As a result, later, i.e. during real operation with a movement of the magnet armature, the portion of the induced voltage signal which is brought about by the magnet armature movement can be determined particularly precisely. Of course, this then also permits particularly precise determination of the actual closing time of the valve.

According to a exemplary embodiment, the test voltage pulse is applied to the coil of the coil drive at a time which has a predefined offset from an ignition time in a cylinder which is assigned to the valve. This means that the test voltage pulse has a predefined offset in relation to the respective ignition time chronologically and/or with respect to a crankshaft angle. Through a suitable selection of this offset, which can correspond, for example, to a crankshaft angle of 180°, it may be possible to ensure that only very small quantities, or negligible quantities, of fuel are additionally introduced into the respective cylinder by the test voltage pulse.

It is to be noted that in order to avoid or limit additional emissions of pollutants, the test voltage pulse can also be generated in particularly suitable operating phases of an internal combustion engine. Apart from during on-going energized engine operation, the test voltage pulse can also be generated, for example, during running on of the engine, before the engine starts and/or during overrun fuel cutoff, in order to determine the reference voltage profile as described above.

According to a further embodiment, the comparison of the test reference voltage profile with the reference voltage profile which is stored in the engine controller comprises the formation of a difference between the test reference voltage profile and the reference voltage profile which is stored in the engine controller. This has the advantage that the comparison can be carried out particularly easily without relatively high computational complexity. Adaptation of the reference voltage profile to the respective operating conditions, carried out online on the basis of a so-called correction of the offset between the test reference voltage profile and the stored reference voltage profile, is therefore easily possible without making available or using a relatively large computational capacity.

It is to be noted that in the described formation of differences it is irrelevant whether the functional values of the reference voltage profile stored in the engine controller are subtracted from the measured values of the test reference voltage profile, or vice versa. The result of the comparison differs in fact only in its sign, which can be suitably be taken into account in the adaptation of the stored reference voltage profile to the reference voltage profile which is adapted to the operating conditions.

According to a further embodiment, the comparison of the test reference voltage profile with the reference voltage profile which is stored in the engine controller comprises the formation of a quotient between the test reference voltage profile and the reference voltage profile which is stored in the engine controller.

A factorial comparison which is carried out by forming a quotient between values of the two profiles which correspond to one another chronologically can also advantageously be carried out without relatively high computational complexity.

It is to be noted that also for the described quotient formation it is irrelevant whether the functional values of the reference voltage profile which is stored in the engine controller are divided by the respective measured values of the test reference voltage profile, or vice versa. If, in fact, the functional values of the reference voltage profile are divided by the respective measured values of the test reference voltage profile, what is obtained as a result is, in fact, in each case simply the reciprocal value of those results which would be obtained if the measured values of the test reference voltage profile were divided by the respective measured values of the test reference voltage profile. This difference can also be suitably be taken into account in the adaptation of the stored reference voltage profile to form the reference voltage profile which is adapted to the operating conditions.

According to a further embodiment, the method also comprises (a) comparing the adapted stored reference voltage profile with a predefined setpoint reference voltage profile, (b) determining at least one adaptation value with which the predefined setpoint reference voltage profile can be changed at least approximately into the adapted stored reference voltage profile, and (c) monitoring the at least one adaptation value for exceeding and/or undershooting of a predefined adaptation threshold.

In this way, excessive deviation of the measured test reference voltage profile from the predefined setpoint reference voltage profile can be quickly and reliably detected. As a result, it is advantageously possible to detect changes in the valve which may be characteristic, for example, of a failure of the valve which is expected shortly. Therefore, it is possible, if necessary, to output a corresponding fault message in the event of the predefined adaptation threshold being exceeded and/or undershot, which fault message can, for example, bring about maintenance or replacement of the corresponding valve. In this way, the operational reliability of the valve or of the internal combustion engine can be significantly improved.

According to a further embodiment, the evaluation of the sensed time profile of the voltage which is induced in the coil is carried out within a time interval which contains the expected closing time. This has the advantage that the evaluation must be carried out only within a restricted time period, with the result that the described method can also be reliably carried out with relatively small computing power. An unnecessary evaluation in time periods in which the closing time is not present with a high degree of certainty can therefore be avoided.

The start of the time interval can, for example, be provided by the expected closing time minus a predefined time period Δt. The end of the time interval may be given, for example, by the expected closing time plus a further predefined time period Δt'. In this context, the predefined time period Δt and the further predefined time period Δt' may be the same. Δt and Δt' should be shorter than the expected time difference, which can easily be determined experimentally, between the first closing time and a second closing time which follows the first closing time after the bouncing of the magnet armature.

This means that the second closing time is outside the observation time window which is provided by Δt and Δt'.

According to a further embodiment, the evaluation of the sensed time profile of the voltage which is induced in the coil comprises comparing a time derivative of the sensed time profile of the voltage which is induced in the coil with a time derivative of the reference voltage profile which is stored in the engine controller. The difference or the quotient between (a) the time derivative of the sensed time profile of the voltage induced in the coil and (b) the time derivative of the reference voltage profile can also be calculated here.

In the case of a difference formation, the closing time can then be determined by a local maximum or by a local minimum (depending on the sign of the difference formation). The evaluation, which comprises both the calculation of the two time derivatives and the difference formation, can also be restricted here to a time interval in which the expected closing time lies.

According to a further embodiment, a device is described for determining a closing time of a valve having a coil drive, wherein the valve is, for example, a direct injection valve for an engine of a motor vehicle. The described device has (a) a switch-off unit for switching off a current flow through a coil of the coil drive, with the result that the coil is de-energized, (b) a sensing unit for sensing a time profile of a voltage which is induced in the de-energized coil, wherein the induced voltage is generated at least partially by a movement of the magnet armature relative to the coil, and (c) an evaluation unit. The evaluation unit is configured (c1) to evaluate the sensed time profile of the voltage which is induced in the coil, wherein the evaluation comprises comparing the sensed time profile of the voltage which is induced in the de-energized coil with a reference voltage profile which is stored in an engine controller and which is adapted to current operating conditions of the valve, and (c2) to determine the closing time on the basis of the evaluated time profile.

The described device is also based on the realization that through operating-state-specific adaptation of the reference voltage profile it is possible to considerably improve the accuracy of a reference-based method for determining the closing time of an injection valve. As a result, closed loop control of solenoid valves can be improved in such a way that (a) ageing effects, (b) fluctuations regarding the level of voltages which are applied to the valve, and/or (c) valve-specific differences can be significantly reduced. As a result, the control quality for the respective valve can be improved and therefore the quantity accuracy, for example in the case of very small injection quantities, can be increased. Since the corresponding control can be carried out actively or online and activated independently of the engine operating state, it is possible to adapt the reference voltage profile in a wide temperature range of the valve.

As has already been described above for the method, with the described device it is also possible to carry out diagnostics of the valve with respect to its controllability for the parameters of induction and/or internal resistance of the coil by monitoring determined adaptation values for the respective reference voltage profile with respect to the reaching and/or exceeding of predefined adaptation thresholds.

According to a further embodiment, a computer program for determining a closing time of a valve having a coil drive, for example of a direct injection valve for an engine of a motor vehicle, is described. The computer program, when executed by a processor, is configured to control the method described above.

In the sense of this document, specifying such a computer program is equivalent to the term of a program element, a computer program product or a computer-readable medium which contains instructions for controlling a computer system in order to coordinate the method of operation of a system or of a method in a suitable way in order to achieve the effects which are linked to the disclosed.

The computer program can be implemented as a computer-readable instruction code in any suitable programming language such as, for example, in JAVA, C++ etc. The computer program can be stored on a computer-readable storage medium (CD-ROM, DVD, Blu-ray disk, interchangeable disk drive, volatile or nonvolatile memory, installed memory/processor access). The instruction code can program a computer or other programmable devices, such as, for example a control device for an engine of a motor vehicle, in such a way that the desired functions are carried out. In addition, the computer program can be provided in a network such as, for example, the Internet, from which it can be downloaded by a user when required.

The disclosed method may be implemented either by means of a computer program, i.e., a piece of software or by means of one or more special electrical circuits, i.e. as hardware or in any desired hybrid form, i.e. by means of software components and hardware components.

It is to be noted that embodiments have been described with reference to different aspects of the disclosure. In particular, some embodiments are described with device claims and other embodiments are described with method claims. However, to a person skilled in the art reading this application it will become immediately clear that, unless stated otherwise, other embodiments may include any desired combination of features disclosed herein.

Figure 7A:
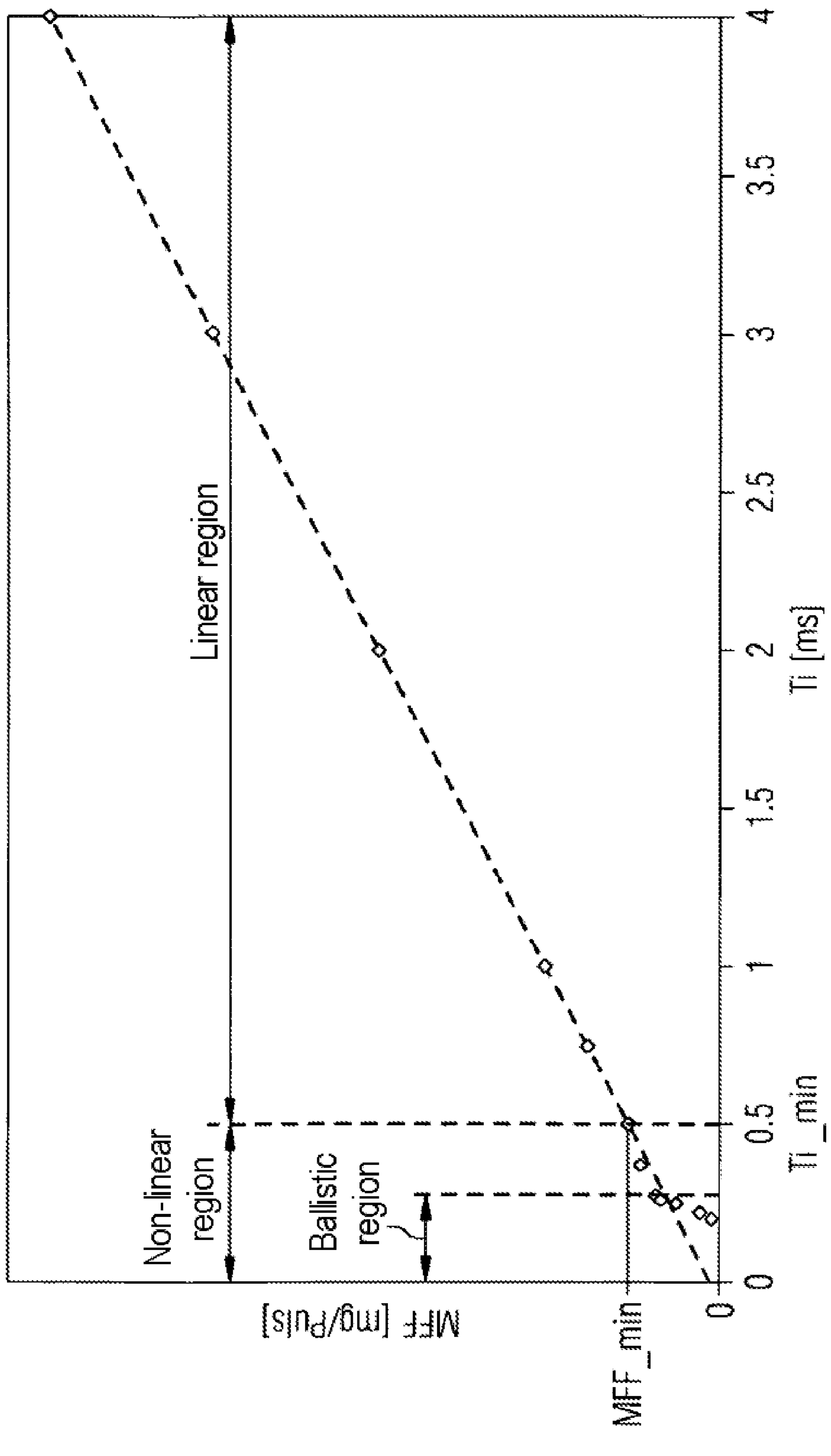
FIG. 7*a* shows the characteristic curve of a known direct injection valve, illustrated in a diagram, in which the injected fuel quantity MFF is plotted as a function of the time period Ti of the electrical actuation.
Figure 7B:
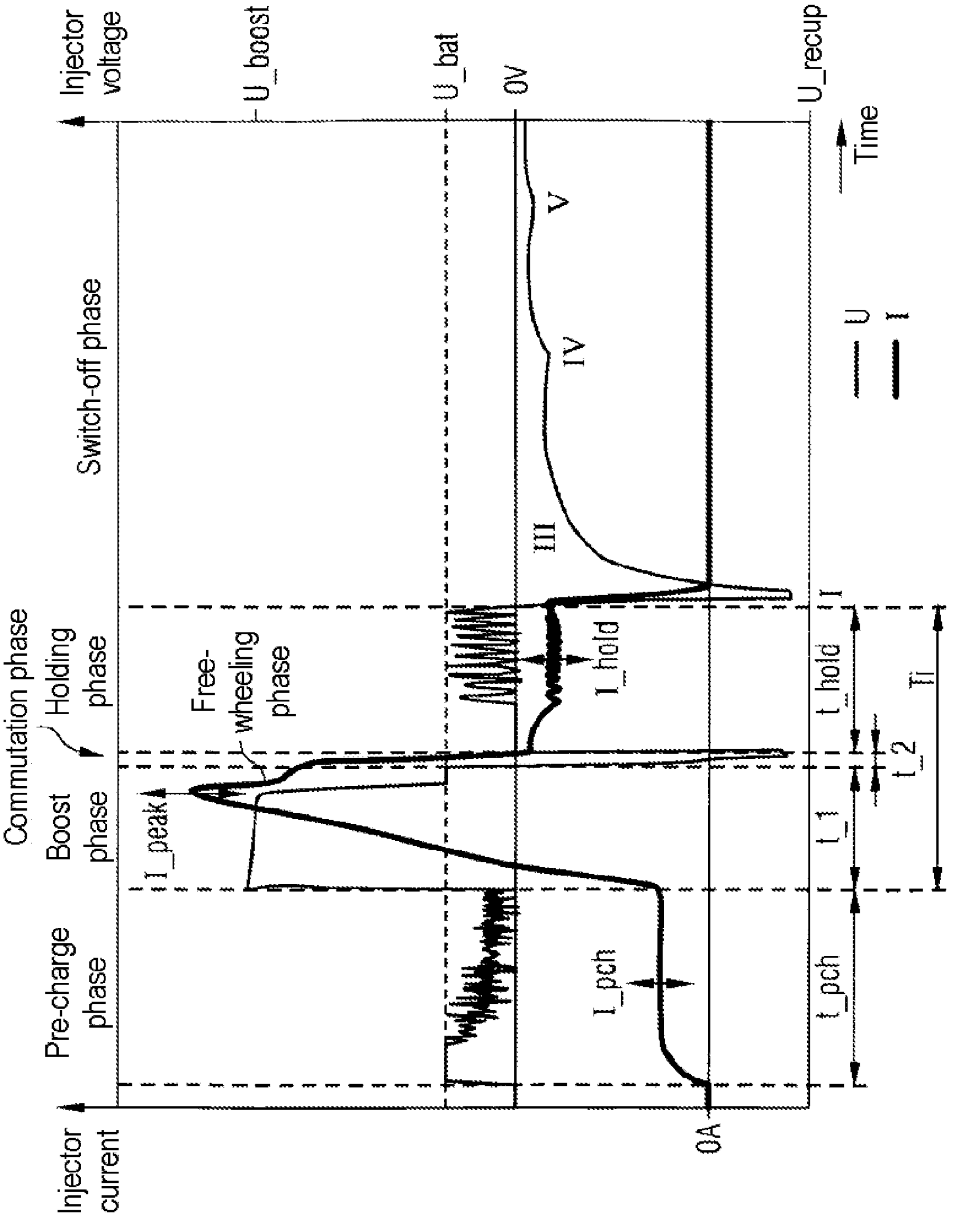
FIG. 7*b* shows a typical current actuation profile and the corresponding voltage profile for a direct injection valve having a coil drive.

The closing time detection method which is described in this application involves the following physical effects which occur in the switch-off phase of an injection valve:

1. Firstly, the switching off of the voltage at the coil of the injection valve gives rise to a self-induction voltage which is limited by the recuperation voltage. The recuperation voltage is typically, in terms of absolute value, somewhat larger than the boost voltage. As long as the self-induction voltage exceeds the recuperation voltage, a current flow occurs in the coil, and the magnetic field in the coil is reduced. The chronological position of this effect is denoted by "I" in FIG. 7*b*.

2. A reduction in the magnetic force already occurs during the decay of the coil current. As soon as the spring prestress and the hydraulic force exceed the decreasing magnetic force owing to the pressure of the fuel to be injected, a resulting force, which accelerates the magnet armature together with the valve needle in the direction of the valve seat is produced.

3. If the self-induction voltage no longer exceeds the recuperation voltage, current no longer flows through the coil. The coil is electrically in what is referred to as the open coil mode. Owing to the ohmic resistances of the magnetic material of the magnet armature, the eddicurrents induced during the reduction of the field of the coil decay exponentially. The decrease in the eddicurrents leads in turn to a change in the field in the coil and therefore to the induction of a voltage. This induction effect leads to a situation in which a voltage value at the coil rises from the level of the recuperation voltage to "zero" volts in accordance with the profile of an exponential function. The chronological position of this effect is denoted by "III" in FIG. 7*b*.

4. Directly before the valve needle impacts in the valve seat, the magnet armature and valve needle reach their maximum speed. At this speed, the air gap between the coil core and the magnet armature becomes larger. Owing to the movement of the magnet armature and the associated increase in the air gap, the remanent magnetism of the magnet armature causes a voltage to be induced in the coil. The maximum induction voltage which occurs characterizes the maximum speed of the magnet armature (and also of the connected valve needle) and therefore the time of the mechanical closing of the valve needle. This induction effect which is caused by the magnet armature and the associated valve needle speed is superimposed on the induction effect owing to the decaying of the eddicurrents. The chronological position of this effect is characterized by "IV" in FIG. 7*b*.

5. After the mechanical closing of the valve needle, a bouncing process typically occurs during which the valve needle is briefly deflected out of the closed position once more. Owing to the spring stress and the applied fuel pressure, the valve needle is, however, pressed back into the valve seat again. The closing of the valve after the bouncing process is characterized by "V" in FIG. 7*b*.

The method described in this application is based on detecting the closing time of the injection valve from the induced voltage profile in the switch-off phase. As explained below in detail, this detection is carried out with a method in which a reference voltage profile is used which describes the portion of the induced voltage profile which is not caused by the relative movement between the coil and the magnet armature.

FIG. 1 shows various signal profiles at the end of the holding phase and in the switch-off phase of a direct injection valve. The transition between the holding phase and the switch-off phase occurs at the switch-off time which is represented by a vertical, dashed line. The current through the coil is illustrated in units of Amperes by the curve provided with the reference symbol 100. An induced voltage signal 110 occurs in the switch-off phase on the basis of a superimposition of the induction effect owing to the magnet armature and valve needle speed and the induction effect owing to the decaying of the eddicurrents. The voltage signal 110 is illustrated in units of 10 volts (cf. right-hand ordinate). It is apparent from the voltage signal 110 that the speed of the increase in the voltage decreases strongly in the region of the closing time before the speed of the increase in the voltage increases again owing to the bouncing back of the valve needle and magnet armature. The curve which is provided with the reference symbol 120 illustrates the time derivative of the voltage signal 110. In this derivative 120, the closing time can be seen at a local minimum 121. After the bouncing back process, a further closing time can be seen at a further minimum 122.

A curve 150 which illustrates the flow of fuel in units of grams per second is also shown in FIG. 1. It is apparent that the measured flow of fuel through the injection valve decreases very quickly starting from the top shortly after the detected closing time. The chronological offset between the closing time, detected on the basis of the evaluation of the actuation voltage, and the time at which the measured fuel flow rate reaches the value zero for the first time, results from the limited measurement dynamics during the determination of the fuel flow rate. Starting from a time of approximately 3.1 ms, the corresponding measurement signal 150 settles at the value "zero".

In order to reduce the computing power which is necessary to carry out the described closing time detection method, the derivative 120 can also be determined merely within a limited time interval which contains the expected closing time.

If, for example, a time interval I is defined with the width 2Δt about the expected closing time $t_{Close\_Expected}$, the following applies to the actual closing time $t_{Close}$:

$$I=[t_{Close\_Expected}=\Delta t,\ t_{Close\_Expected}+\Delta t]$$

$$U_{min}=\min\{dU(t)/dt|t||\epsilon I\}$$

$$t_{close}=\{t||\epsilon I|U(t)=U_{min}\} \quad (1)$$

As already indicated above, this approach can be extended to detecting the renewed closing of the valve on the basis of a bouncing valve needle at a time $t_{close\_Bounce}$. To do this, a time interval with the width $2\Delta t_{Bounce}$ is defined about the time $t_{Close\_Bounce\_Expected}$ of the expected closing after the first bouncing process. The time $t_{Close\_Bounce\_Expected}$ is defined relative to the closing time $t_{Close}$ by means of $t_{Close\_Bounce\_Expected}$.

$$I_{bounce}=[t_{close}+t_{Close\_Bounce\_Expected}-\Delta t_{Bounce},\ t_{close}+t_{Close\_Bounce\_Expected}+\Delta t_{Bounce}]$$

$$U_{min\_Bounce}=\min\{dU(t)/dt|t||\epsilon I_{Bounce}\}$$

$$t_{close\_bounce}=\{t||\epsilon I_{Bounce}|U(t)=U_{min\_Bounce}\}$$

Figure 2:
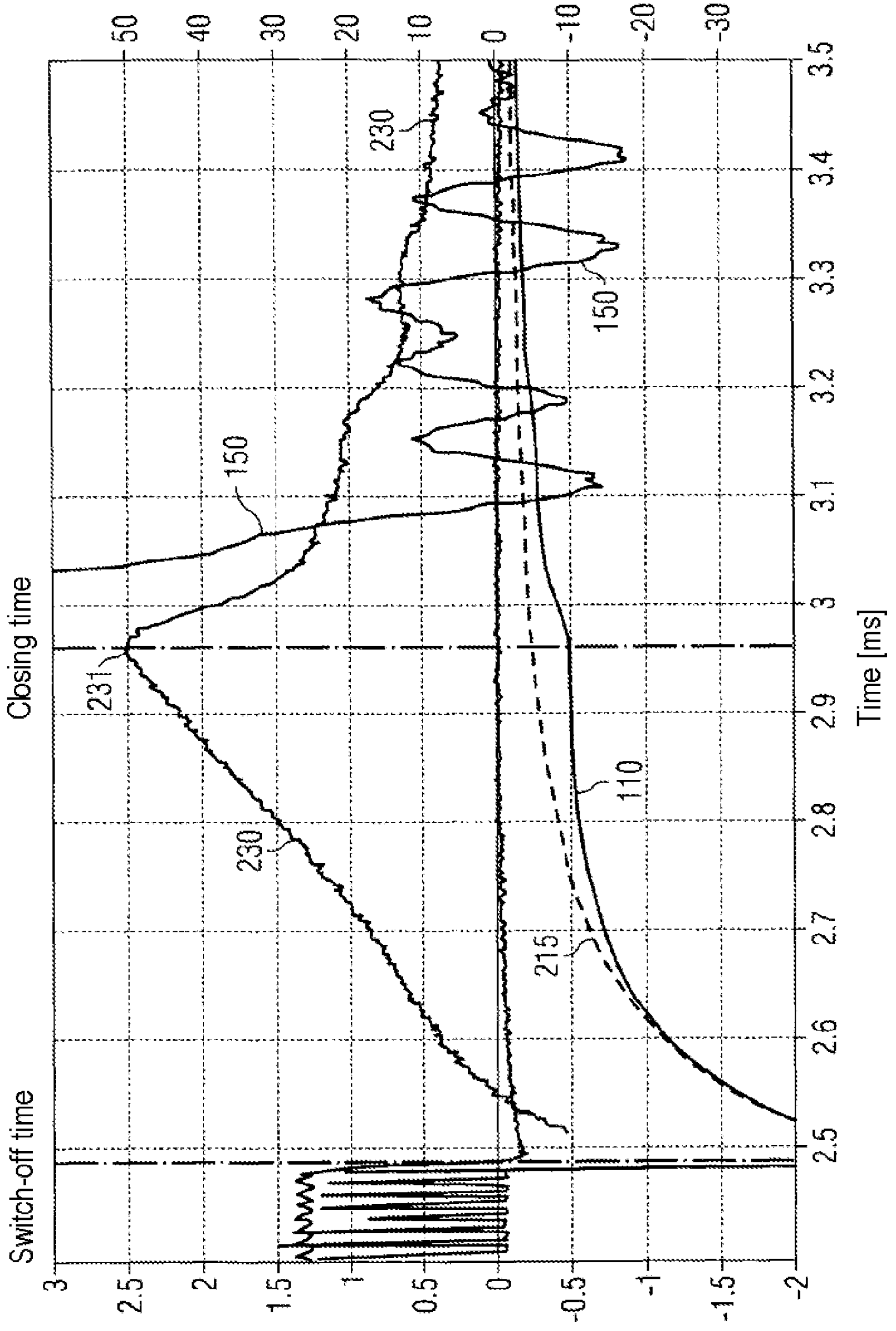
FIG. 2 shows detection of the closing time of a valve using a reference voltage profile which characterizes, after the end of the holding phase, an induction effect in the coil owing to the decaying of eddicurrents in the magnet armature.

FIG. 2 shows a detection of the closing time using a reference voltage profile which characterizes the induction effect in the coil owing to decaying of eddicurrents in the magnet armature. The end of the holding phase and the switch-off phase are illustrated in FIG. 2 as in FIG. 1. The measured voltage profile 110, which arises from superimposition of the induction effect owing to the air gap speed and the identical valve needle speed and the induction effect owing to decaying of the eddicurrents is the same as in FIG. 1. The coil current 100 is also unchanged compared to FIG. 1.

The idea is now to calculate, by means of a reference model, the portion of the voltage signal 110 which is caused exclusively by the induction effect owing to the decaying of the eddicurrents. A corresponding reference voltage signal is illustrated by the curve with the reference symbol 215. The induction effect owing to decaying eddicurrents can be eliminated by determining the voltage difference between the measured voltage profile 110 and the reference voltage signal 215. The difference voltage signal 230 therefore characterizes the movement-related induction effect and is a direct measure of the speed of the magnet armature and of the valve needle. The maximum 231 of the difference voltage signal 230 characterizes the maximum magnet armature speed or valve needle speed which is reached directly before the needle impacts on the valve seat. The maximum 231 of the difference voltage signal can therefore be used to determine the actual closing time $t_{Close\_}$.

The profile of the reference voltage signal 215 can not only be calculated by means of a suitably programmed computing unit but also modeled with an electronic circuit, i.e. in hardware. Such a circuit for detecting the closing time is advantageously composed of three function groups:

a) a generator circuit for generating the reference voltage signal 215, which models the exponentially decaying coil voltage, induced by the eddicurrents, in synchronism with the switch-on process. The generator voltage is also referred to below as a reference generator.

b) a subtraction circuit for forming differences between the coil voltage 110 and the reference voltage signal 215 in order to eliminate the voltage portion, induced by the eddicurrents, of the voltage signal 110. As a result, essentially the movement-induced portion of the coil voltage remains.

c) an evaluation circuit for detecting the maximum 231 of the movement-induced portion of the coil voltage, which induces the closing time of the injector.

Figure 3:
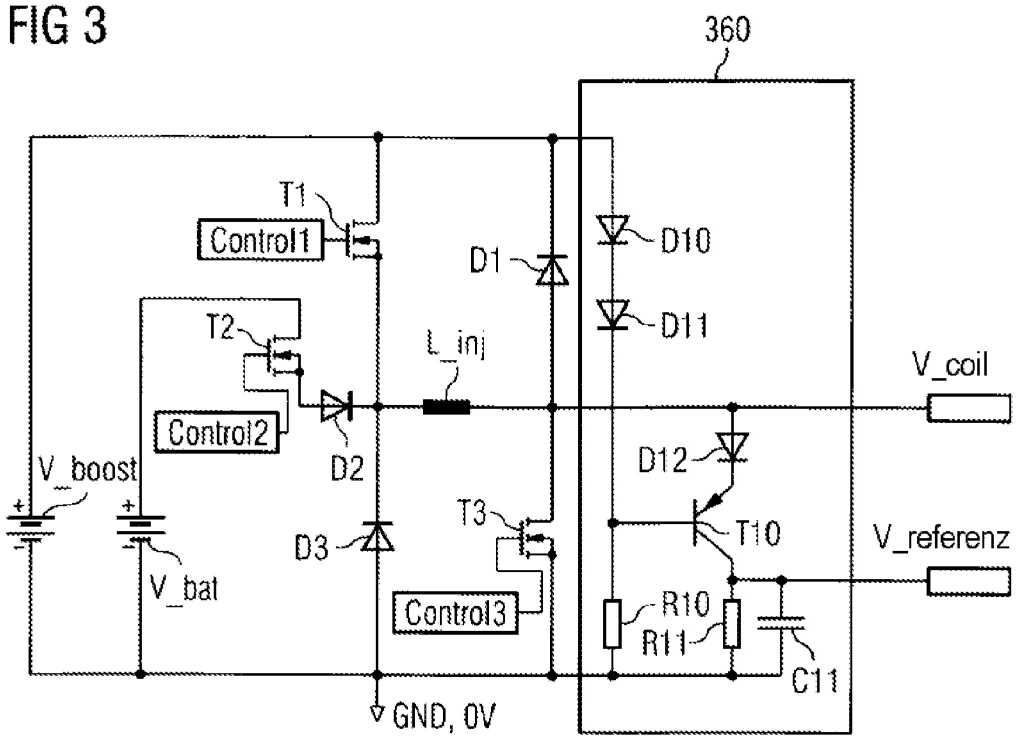
FIG. 3 shows an output stage which is provided for actuating a direct injection valve and which has a reference generator for generating a reference voltage profile.

FIG. 3 shows an output stage which is provided for actuating a valve and which has such a reference generator 360 for generating the reference voltage profile.

During the switch-off phase, the transistors T1, T2 and T3 are switched off by means of the actuation signals Control1, Control2 and Control3. The voltage generated by the magnetic flux in the injector coil L_inj causes the voltage at the recuperation diode D1 to rise until the recuperation diode D1 and a free-wheeling diode D3 become conductive and a current flow is produced between the boost voltage V_boost and ground (GND).

It is to be noted that the coil voltage is represented as a differential voltage in FIGS. 1 and 2. Accordingly, the switch-off voltage has negative values. However, in the real circuit the left-hand side of the coil L_inj is approximately at ground here, while the right-hand side of the coil L_inj is at a positive voltage value.

In the reference generator 360, the coil voltage V_Spule is fed to the emitter of an NPN-type transistor T10 via a diode D12. The base voltage of said NPN-type transistor T10 is determined by means of a voltage divider, which has the diodes D10 and D11 and the resistor R10, as having a value of approximately 1.4 V below the voltage of V_boost. As long as the coil voltage V_Spule is significantly lower than V_boost, T10 is de-energized owing to the diode D12 which is then operated in the off direction, with the result that the voltage at the resistor R11 is 0 V. During the switch-off phase, the coil voltage V_Spule rises to V_boost plus the flux voltage from the diode D1. As a result, the transistor T10 is switched on and charges a capacitor C11, with the result that the voltage V_Referenz rises quickly to the value of V_boost. The charge current through the transistor T10 is significantly higher here than the discharge current through the resistor R11. If the coil is discharged to such an extent that its voltage drops below V_boost, T10 switches off and the capacitor C11 is then discharged through the resistor R11. Given a suitable selection of the component values, the discharge curve has here the desired exponentially decaying profile which occurs in synchronism with the profile of the coil voltage V_Spule.

Figure 4A:
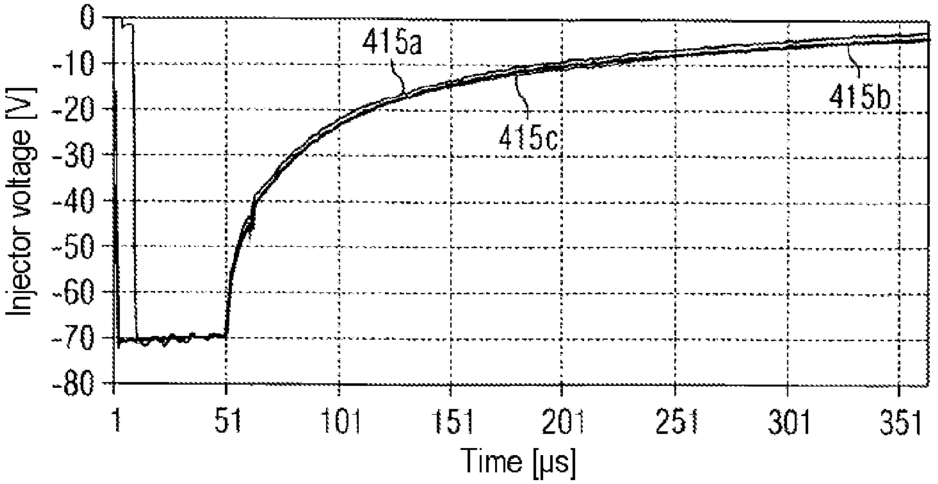
FIGS. 4*a* and 4*b* show the respective reference voltage profiles for various injectors and for various temperatures.
Figure 4B:
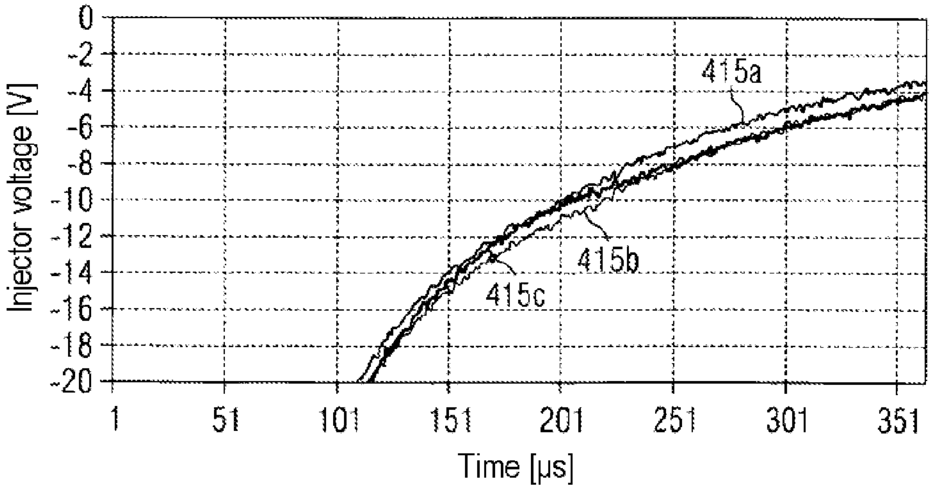

FIGS. 4*a* and 4*b* show the respective reference voltage signals for various injectors and for various temperatures. In the illustration selected in FIG. 4*a*, there are hardly any differences to be seen between three different reference voltage profiles 415*a*, 415*b* and 415*c*. The differences between the various reference voltage profiles 415*a*, 415*b* and 415*c* can be seen clearly in FIG. 4*b*, which shows a detail from the diagram in FIG. 4*a* in an enlarged illustration.

All three reference voltage profiles 415*a*, 415*b* and 415*c* are based on experimentally determined data, wherein the actuation of the respective valve by means of in each case one test voltage pulse was so short that a resulting movement of the magnet armature of the valve was negligible. According to the exemplary embodiment illustrated here, a test voltage pulse with a pulse length of approximately 0.3 milliseconds was applied to the coils of the valves. The reference voltage profile 415*a* was measured with a first valve or injector I1 at a temperature of 80° C. The reference voltage profile 415*b* was measured with the first injector I1 at a temperature of −20° C. The reference voltage profile 415*c* was measured with a second injector I2 at a temperature of 80° C.

In order to be able to compare the experimentally determined curves 415*a*, 415*b* and 415*c* as well as possible, they were laid one on top of the other in such a way that the bends in the various reference voltage profiles 415*a*, 415*b* and 415*c* coincide at t=51 μs. In this context, it is to be noted that the differences in the curve profiles at the time window of 1 μs to approximately 10 μs do not have any further significance and represent an artefact which is caused by the specified synchronization of the bends.

Figure 5:
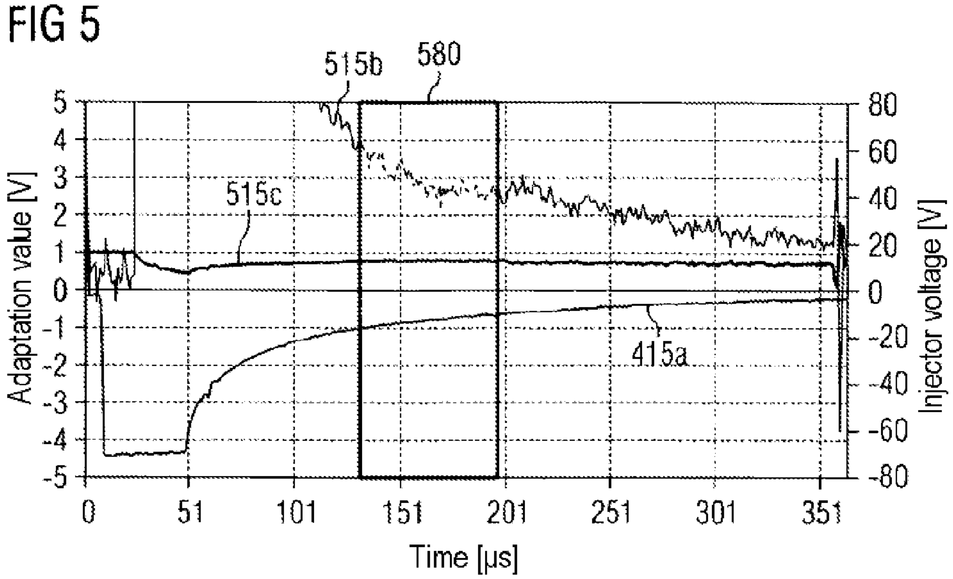
FIG. 5 shows a comparison of a factorial adaptation and a differential adaptation of reference voltage profiles for two different operating temperatures.

FIG. 5 shows a comparison of a factorial adaptation and a differential adaptation of reference voltage profiles for two different operating temperatures.

In detail, FIG. 5 firstly shows the reference voltage profile 415*a* which is known from FIGS. 4*a* and 4*b*. The curve 515*b* represents the difference between (a) the reference voltage profile 415*a* and the reference voltage profile 415*b*. The curve 515*c* shows the quotient between (a) the reference voltage profile 415*a* and the reference voltage profile 415*b*.

In order to adapt the reference voltage profile 215 (cf. FIG. 2), which is necessary for precise determination of the valve closing time and is stored as a characteristic curve in the engine controller, to the current operating conditions of the valve, for example the difference 515*b* between the various reference voltage profiles 415*a* and 415*b* or the quotient 515*c* between the reference voltage profiles 415*a* and 415*b* can be used within a time window 580 in which the closing time is expected.

From the measurement results illustrated in FIG. 5 it is apparent that for the example shown here the factorial correction 515*c*, i.e. the multiplication of the reference voltage profile within the observation time window 580 by an adaptation value is the more precise method for adapting a reference voltage profile 215 (cf. FIG. 2), which is stored as a characteristic curve, to the current operating conditions of the respective injector or valve.

Figure 6:
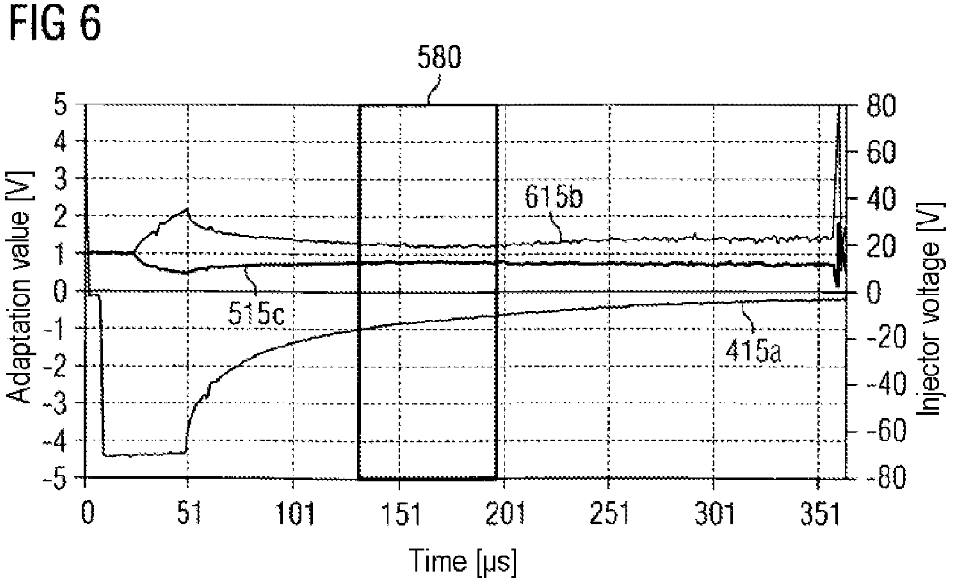
FIG. 6 shows two factorial comparisons of reference voltage profiles for different valves or different temperatures.

FIG. 6 shows a factorial comparison between (a) a reference voltage profile for a first valve at a first temperature and (b) a reference voltage profile for a second valve at the first temperature or a reference voltage profile for the first valve at a second temperature.

In detail, FIG. 6 firstly also shows the reference voltage profile 415*a* which is known from FIGS. 4*a* and 4*b*. In addition, FIG. 6 shows the curve 515*c* which is known from FIG. 5 and which illustrates the quotient between (a) the reference voltage profile 415*a* and the reference voltage profile 415*b*. The curve 615*b* shows the quotient between (a) the reference voltage profile 415*a* and the reference voltage profile 415*b*.

It is to be noted that a reference voltage profile adaptation by means of an offset or a differential comparison or by means of a multiplication factor or a factorial comparison is mentioned only by way of example in this document. In addition to any other desired types of adaptation, for example a combination of the adaptations described here by means of an offset and a multiplication factor is also possible.

It is also to be noted that the method described in this document can be applied not only in conjunction with a gasoline direct injection valve. The described method for detecting the closing of the control valve can also be used in a diesel injection valve with a coil drive. Furthermore, the described method can also be used for detecting the closing of the valve needle in a directly driven diesel injection valve with a coil drive.

LIST OF REFERENCE SYMBOLS

100 Coil current [A]
110 Voltage signal [10 V]
120 Time derivative of voltage signal [V/ms]
121 Local minimum/closing time
122 Further local minimum/further closing time
150 Fuel flow rate [g/s]
215 Reference voltage signal [10 V]
230 Difference voltage signal [V]
231 Maximum of difference voltage signal
360 Reference generator
C11 Capacitor
D1 Recuperation diode
D3 Free-wheeling diode
D10/D11/D12 Diode
GND Ground potential (0 V)
L_inj Coil/injector coil
R10 Resistor
R11 Resistor
T1/T2/T3 Transistor
T10 Transistor
U_bat Battery voltage
U_boost Boost voltage
U_Spule Coil voltage
U_Referenz Reference voltage
415*a* Reference voltage profile injector I1, T=80° C.
415*b* Reference voltage profile injector I1, T=−20° C.
415*c* Reference voltage profile injector I2, T=−20° C.
515*b* Difference between reference voltage profiles 415*a* and 415*b*
515*c* Difference between reference voltage profiles 415*a* and 415*c*
580 Time window

What is claimed is:

1. A method for determining a closing time of an injection valve having a coil drive, for use in an internal combustion engine of a motor vehicle, the method comprising:

switching off a current flow through a coil of the coil drive, with the result that the coil is de-energized, sensing of a time profile of a voltage which is induced in the de-energized coil, wherein the induced voltage is generated at least partially by a movement of the magnet armature relative to the coil, evaluating the sensed time profile of the voltage which is induced in the coil, wherein the evaluation comprises comparing the sensed time profile of the voltage which is induced in the de-energized coil with a reference voltage profile stored in an engine controller, and determining the closing time based on the comparison of the sensed time profile of the voltage with the reference voltage profile stored in the engine controller, wherein the reference voltage profile is adapted to the current operating conditions of the valve, determining a test reference voltage profile by applying a test voltage pulse to the coil of the coil drive, wherein the time period of the test voltage pulse is dimensioned in such a way that the movement of the magnet armature relative to the coil is smaller than a predefined threshold value, comparing the test reference voltage profile with the reference voltage profile stored in the engine controller, and adapting the stored reference voltage profile based on a result of the comparison of the test reference voltage profile with the reference voltage profile stored in the engine controller.

2. The method of claim 1, wherein the test reference voltage profile is determined in that, after the end of the applied test voltage pulse, the time profile of the voltage which is induced in the de-energized coil is sensed.

3. The method of claim 1, wherein the test voltage pulse is applied to the coil of the coil drive at a time which has a predefined offset from an ignition time in a cylinder which is assigned to the valve.

4. The method of claim 1, wherein the comparison of the test reference voltage profile with the reference voltage profile which is stored in the engine controller comprises the formation of a difference between the test reference voltage profile and the reference voltage profile which is stored in the engine controller.

5. The method of claim 1, wherein the comparison of the test reference voltage profile with the reference voltage profile which is stored in the engine controller comprises the formation of a quotient between the test reference voltage profile and the reference voltage profile which is stored in the engine controller.

6. The method a of claim 1, further comprising comparing the adapted stored reference voltage profile with a predefined setpoint reference voltage profile, determining at least one adaptation value with which the predefined setpoint reference voltage profile can be changed at least approximately into the adapted stored reference voltage profile, and monitoring the at least one adaptation value for exceeding and/or undershooting of a predefined threshold.

7. The method of claim 1, wherein the evaluation of the sensed time profile of the voltage which is induced in the coil is carried out within a time interval which contains the expected closing time.

8. The method of claim 4, wherein the evaluation of the sensed time profile of the voltage which is induced in the coil comprises comparing a time derivative of the sensed time profile of the voltage which is induced in the coil with a time derivative of the reference voltage profile which is stored in the engine controller.

9. A device for determining a closing time of a valve having a coil drive, the device comprising:

a switch-off unit for switching off a current flow through a coil of the coil drive, with the result that the coil is de-energized, a sensing unit for sensing a time profile of a voltage which is induced in the de-energized coil, wherein the induced voltage is generated at least partially by a movement of the magnet armature relative to the coil, an evaluation unit, configured:

to evaluate the sensed time profile of the voltage which is induced in the coil, wherein the evaluation comprises comparing the sensed time profile of the voltage which is induced in the de-energized coil with a reference voltage profile which is stored in an engine controller and which is adapted to current operating conditions of the valve, to determine the closing time based on the evaluated time profile, to determine a test reference voltage profile by applying a test voltage pulse to the coil of the coil drive, wherein the time period of the test voltage pulse is dimensioned in such a way that the movement of the magnet armature relative to the coil is smaller than a predefined threshold value, to compare the test reference voltage profile with the reference voltage profile stored in the engine controller, and to adapt the stored reference voltage profile based on a result of the comparison of the test reference voltage profile with the reference voltage profile stored in the engine controller.

10. A method for determining a closing time of a valve having a coil drive, the method comprising:

switching off a current flow through a coil of the coil drive, with the result that the coil is de-energized, sensing of a time profile of a voltage which is induced in the de-energized coil, wherein the induced voltage is generated at least partially by a movement of the magnet armature relative to the coil, evaluating the sensed time profile of the voltage which is induced in the coil, wherein the evaluation comprises comparing the sensed time profile of the voltage which is induced in the de-energized coil with a reference voltage profile stored in an engine controller, determining the closing time based on the comparison of the sensed time profile of the voltage with the reference voltage profile stored in the engine controller, wherein the reference voltage profile is adapted to the current operating conditions of the valve, determining a test reference voltage profile by applying a test voltage pulse to the coil of the coil drive, wherein the time period of the test voltage pulse is dimensioned in such a way that the movement of the magnet armature relative to the coil is smaller than a predefined threshold value, comparing the test reference voltage profile with the reference voltage profile stored in the engine controller, and adapting the stored reference voltage profile based on a result of the comparison.

* * * * *